(12) United States Patent
Bosteels et al.

(10) Patent No.: US 11,517,002 B1
(45) Date of Patent: Dec. 6, 2022

(54) ARTEMIA HARVESTING DEVICE

(71) Applicant: Great Salt Lake Brine Shrimp Cooperative, Inc., Ogden, UT (US)

(72) Inventors: Thomas M. J. G. Bosteels, Ogden, UT (US); Philip D. Brown, Ogden, UT (US); Shawn G. Smith, Ogden, UT (US)

( * ) Notice: Subject to any disclaimer, the term of this patent is extended or adjusted under 35 U.S.C. 154(b) by 692 days.

(21) Appl. No.: 15/722,811

(22) Filed: Oct. 2, 2017

Related U.S. Application Data

(60) Provisional application No. 62/403,020, filed on Sep. 30, 2016.

(51) Int. Cl.
| | |
|---|---|
| *A01K 73/02* | (2006.01) |
| *A01K 73/00* | (2006.01) |
| *A01K 75/04* | (2006.01) |
| *A01K 73/053* | (2006.01) |
| *A01K 75/00* | (2006.01) |
| *A01K 69/02* | (2006.01) |

(52) U.S. Cl.
CPC ............ *A01K 73/025* (2013.01); *A01K 73/00* (2013.01); *A01K 73/053* (2013.01); *A01K 75/04* (2013.01); *A01K 69/02* (2013.01); *A01K 75/00* (2013.01)

(58) Field of Classification Search
CPC ...... A01K 73/00; A01K 73/02; A01K 73/025; A01K 73/04; A01K 73/045; A01K 73/053; A01K 73/12; A01K 74/00; A01K 79/00; A01K 80/00; A01K 75/00; A01K 75/04
USPC .............. 43/6.5, 7, 8, 9.3, 9.4, 9.1; 114/255; 56/8, 9
See application file for complete search history.

(56) References Cited

U.S. PATENT DOCUMENTS

| | | | | |
|---|---|---|---|---|
| 1,061,082 A | * | 5/1913 | Kahrs .................... | A01K 73/02 |
| | | | | 43/9.95 |
| 1,388,414 A | * | 8/1921 | Dros ...................... | A01K 79/00 |
| | | | | 43/17.1 |

(Continued)

FOREIGN PATENT DOCUMENTS

| | | | | |
|---|---|---|---|---|
| DE | 416627 C | * | 7/1925 | ............. A01K 74/00 |
| DE | 1091809 B | * | 10/1960 | |

(Continued)

OTHER PUBLICATIONS

Translation of FR 2735329 (Year: 1996).*

*Primary Examiner* — Darren W Ark
(74) *Attorney, Agent, or Firm* — Brent T. Winder; Winder Intellectual Property Law LLC

(57) ABSTRACT

A harvesting device particularly suited for harvesting artemia cysts. The invention in its various embodiments comprises a frame and a net coupled to the frame. The frame can include a front support frame, a rear support frame and a sledding frame. A net having a first end and a second end can be secured to the front and rear support frames respectively. In certain embodiments, the net has an aspect ratio or 4:1. One or more skids can be coupled to the frame. In certain embodiments, the skids are coupled to the sledding frame. In yet other embodiments, the skids are coupled to the sledding frame at substantially the joining of the front support frame and the sledding frame. The second end of the net can be attached to a conduit in communication with a harvest vessel by a coupling. The harvest vessel can include one or more dewatering stations in communication with the conduit.

18 Claims, 17 Drawing Sheets

(56) References Cited

U.S. PATENT DOCUMENTS

| | | | | |
|---|---|---|---|---|
| 1,467,763 A * | 9/1923 | Lybeck | A01K 79/00 | 43/6.5 |
| 1,486,485 A * | 3/1924 | Frissell | A01K 80/00 | 43/6.5 |
| 1,606,668 A * | 11/1926 | Rubach | A01K 79/00 | 43/6.5 |
| 1,852,491 A * | 4/1932 | Sykes | A01K 73/02 | 43/9.95 |
| 1,959,793 A * | 5/1934 | Lafredo | A01K 80/00 | 43/9.1 |
| 1,997,149 A * | 4/1935 | Lake | B63C 11/44 | 396/28 |
| 2,081,146 A * | 5/1937 | Herrington | A01K 73/02 | 43/9.1 |
| 2,300,178 A * | 10/1942 | Ross | A01K 73/00 | 43/9.4 |
| 2,672,700 A * | 3/1954 | Hanks, Jr. | A01K 80/00 | 37/315 |
| 2,684,549 A * | 7/1954 | Olden | A01K 80/00 | 43/9.4 |
| 3,035,366 A * | 5/1962 | Luketa | A01K 73/02 | 43/9.95 |
| 3,087,271 A * | 4/1963 | Luketa | A01K 73/02 | 43/9.95 |
| 3,121,968 A * | 2/1964 | Luketa | A01K 75/04 | 43/9.5 |
| RE25,748 E * | 3/1965 | Luketa | A01K 73/02 | 43/9.95 |
| 3,188,765 A * | 6/1965 | Luketa | A01K 73/02 | 43/9.95 |
| 3,205,605 A * | 9/1965 | Luketa | A01K 73/02 | 43/9.95 |
| 3,220,136 A * | 11/1965 | Luketa | A01K 73/02 | 43/9.95 |
| 3,458,947 A * | 8/1969 | Ross | A01K 73/00 | 43/9.3 |
| 3,561,150 A * | 2/1971 | Silchenstedt | A01K 79/00 | 43/4.5 |
| 3,608,217 A * | 9/1971 | Voisin, Sr. | A01K 80/00 | 37/316 |
| 3,624,932 A * | 12/1971 | Doyle | A01K 80/00 | 37/308 |
| 3,782,020 A * | 1/1974 | Puckett | A01K 73/00 | 43/8 |
| 3,786,592 A * | 1/1974 | Miller | A01K 74/00 | 43/6.5 |
| 4,086,717 A * | 5/1978 | Aucoin, Jr. | A01K 74/00 | 43/6.5 |
| 4,299,047 A * | 11/1981 | Collins | A01K 73/053 | 43/9.5 |
| 4,351,127 A * | 9/1982 | Mitchell | A01K 73/00 | 43/104 |
| 4,458,621 A * | 7/1984 | De Clifford | B63B 35/00 | 43/6.5 |
| 4,663,879 A * | 5/1987 | Bergeron, Jr. | A01K 80/00 | 43/6.5 |
| 4,697,372 A * | 10/1987 | Leonard | A01K 73/04 | 43/9.1 |
| 4,697,373 A * | 10/1987 | May | A01K 73/12 | 43/9.5 |
| 4,783,927 A * | 11/1988 | Leonard | A01K 73/04 | 43/9.4 |
| 5,361,528 A * | 11/1994 | Peacock | A01K 73/02 | 43/6.5 |
| 5,644,863 A * | 7/1997 | Verburg | A01K 79/02 | 43/9.4 |
| 5,722,196 A * | 3/1998 | Flynn | A01K 73/12 | 43/9.4 |
| RE36,057 E * | 1/1999 | Martin, Sr. | A01K 73/02 | 43/7 |
| 6,328,165 B1 * | 12/2001 | Baker | A01K 79/00 | 43/6.5 |
| 7,610,699 B2 * | 11/2009 | Boudreau | A01K 80/00 | 43/9.4 |
| 7,748,146 B2 * | 7/2010 | Quintin, Jr. | A01K 80/00 | 43/9.4 |
| 8,020,336 B2 * | 9/2011 | Hu | A01K 73/05 | 43/9.7 |
| 2005/0160656 A1 * | 7/2005 | Safwat | D04C 1/12 | 43/9.95 |
| 2010/0089016 A1 * | 4/2010 | Grimes | A01D 44/00 | 56/9 |
| 2019/0061890 A1 * | 2/2019 | Fiorello | A01K 69/08 | |
| 2021/0321840 A1 * | 10/2021 | Storvik | A01K 80/00 | |

FOREIGN PATENT DOCUMENTS

| | | | | |
|---|---|---|---|---|
| FR | 497569 A * | 12/1919 | | A01K 73/00 |
| FR | 41640 E * | 2/1933 | | |
| FR | 2159245 A1 * | 6/1973 | | G01S 15/523 |
| FR | 2410432 A1 * | 6/1979 | | A01K 73/02 |
| FR | 2735329 A1 * | 12/1996 | | A01K 79/00 |
| GB | 819865 A * | 9/1959 | | A01K 74/00 |
| GB | 1483887 A * | 8/1977 | | A01K 73/12 |
| GB | 2093322 A * | 9/1982 | | A01K 80/00 |
| JP | 2008022786 A * | 2/2008 | | |
| KR | 20110093739 A * | 8/2011 | | |
| KR | 101080143 B1 * | 11/2011 | | |
| KR | 20150046416 A * | 4/2015 | | |
| SU | 449696 A1 * | 11/1974 | | |
| WO | WO-9815174 A1 * | 4/1998 | | A01K 73/02 |

* cited by examiner

ARTEMIA HARVESTING DEVICE

PRIORITY

This application claims priority to U.S. provisional patent application No. 62/403,020, filed Sep. 30, 2016 the content of which is hereby incorporated by reference in its entirety for its supporting teachings.

BACKGROUND

Traditionally Artemia salina, commonly known as brine shrimp, cysts collecting on the surface of a water body have been harvested using a variety of devices. These floating cysts often concentrate in streaks through wind and currents. Existing harvest devices have focused on further concentrating these surface accumulations and mechanically transferring the floating cysts into holding containers on harvest vessels and/or on the shore of the lake.

Brine shrimp cysts will not only float on the surface of the body of water, but may at times be dispersed in the water column; accumulate on the bottom of the body of water; or accumulate into dense concentrations in the water column either just below the water surface or further down in the water column.

The Great Salt Lake—which has a large brine shrimp population and is a commonly harvested body of water—usually contains a monimolimnion (referred to colloquially as the deep brine layer) characterized by higher salinity and separated from the less saline overlying water column by a layer of rapid salinity change (chemocline). Benthic cysts have a tendency to accumulate at the chemocline and within the monimolimnion and will at times accumulate in dense concentrations, possibly as a result of currents and other non-determined reasons. Sonar technology can be used to detect sub surface accumulations of cysts be it at the chemocline or in the water column.

The present invention in its various embodiments allows for harvesting of non-floating cyst accumulations, be they at the chemocline, within the monimolimnion or within the water column below the surface of the lake.

SUMMARY

The present invention is a harvesting device particularly suited for harvesting artemia. The invention in its various embodiments comprises a frame and a net coupled to the frame. According to one embodiment, the frame includes a front support frame, a rear support frame and a sledding frame. A net having a first end and a second end is secured to the front and rear support frames respectively. In certain embodiments, the net has an aspect ratio of at least approximately 4:1. One or more skids can be coupled to the frame. In certain embodiments, the skids are coupled to the sledding frame. In yet other embodiments, the skids are coupled to the sledding frame at substantially the joining of the front support frame and the sledding frame. In certain embodiments, the second end of the net is capable of attaching to a conduit in communication with a harvest vessel by a coupling. The harvest vessel can include one or more dewatering stations in communication with the conduit. The coupling can further comprise a rigid section with a fitting. In some embodiments, the second end of the net includes a cod end frame which can further comprise a locking pin that corresponds to a groove on the coupling. The coupling can further include a tensioner.

In certain embodiments, a pumping mechanism is included at substantially the first end of the net. In yet other embodiments, a pumping mechanism is included between the first end of the net and the second end of the net.

According to yet other embodiments of the present invention, the harvesting device can include a frame having a front section and a back section connected by two lateral sections. A net having a first end and a second end are secured to the front section and the back sections of the frame respectively, whereby the net remains substantially taut. In certain embodiments, the net has an aspect ratio of at least approximately 4:1. One or more skids can be coupled to the two lateral sections.

In certain embodiments, the skids are coupled to the two lateral sections at substantially the joining of the two lateral sections with the front section. In other embodiments, the second end of the net is capable of attaching to a conduit in communication with a harvest vessel by a coupling. The harvest vessel can include one or more dewatering stations in communication with the conduit. The coupling can further comprise a rigid section with a fitting.

In certain embodiments, the second end of the net includes a cod end frame which can further comprise a locking pin that corresponds to a groove on the coupling. The coupling can in certain embodiments also include a tensioner.

In some embodiments, the harvest device includes a pumping mechanism at substantially the first end of the net. In yet other embodiments, a pumping mechanism is included between the first end of the net and the second end of the net. The pumping mechanisms can be perforated conduits.

DESCRIPTION OF ILLUSTRATED EMBODIMENTS

Referring to FIGS. 1-8, the harvest device includes a net 100 having a first end 102 with an opening 104 for receiving a catch. The net also includes a cod end 106 that is typically smaller in diameter than the first end 102 and forms a generally conical shape. The aspect ratio of the net (defined as the ratio of the length of the net to the width of the net)—which is typically at least approximately 4:1—allows the net to be largely self-cleaning. As is discussed further below, the sort of netting that must be used in harvesting brine shrimp cysts has very small openings that are easily clogged. A longer aspect ratio allows more longitudinal force across the mesh of the net. This improves the self-cleaning action of the net: reducing clogging on the sides and allowing more water to pass through the net and concentrate the brine shrimp cysts in a slurry at the cod end of the net. Although an aspect ratio of 4:1 or greater is not required, it is preferred to increase the efficiency of the harvest device.

Figure 5:
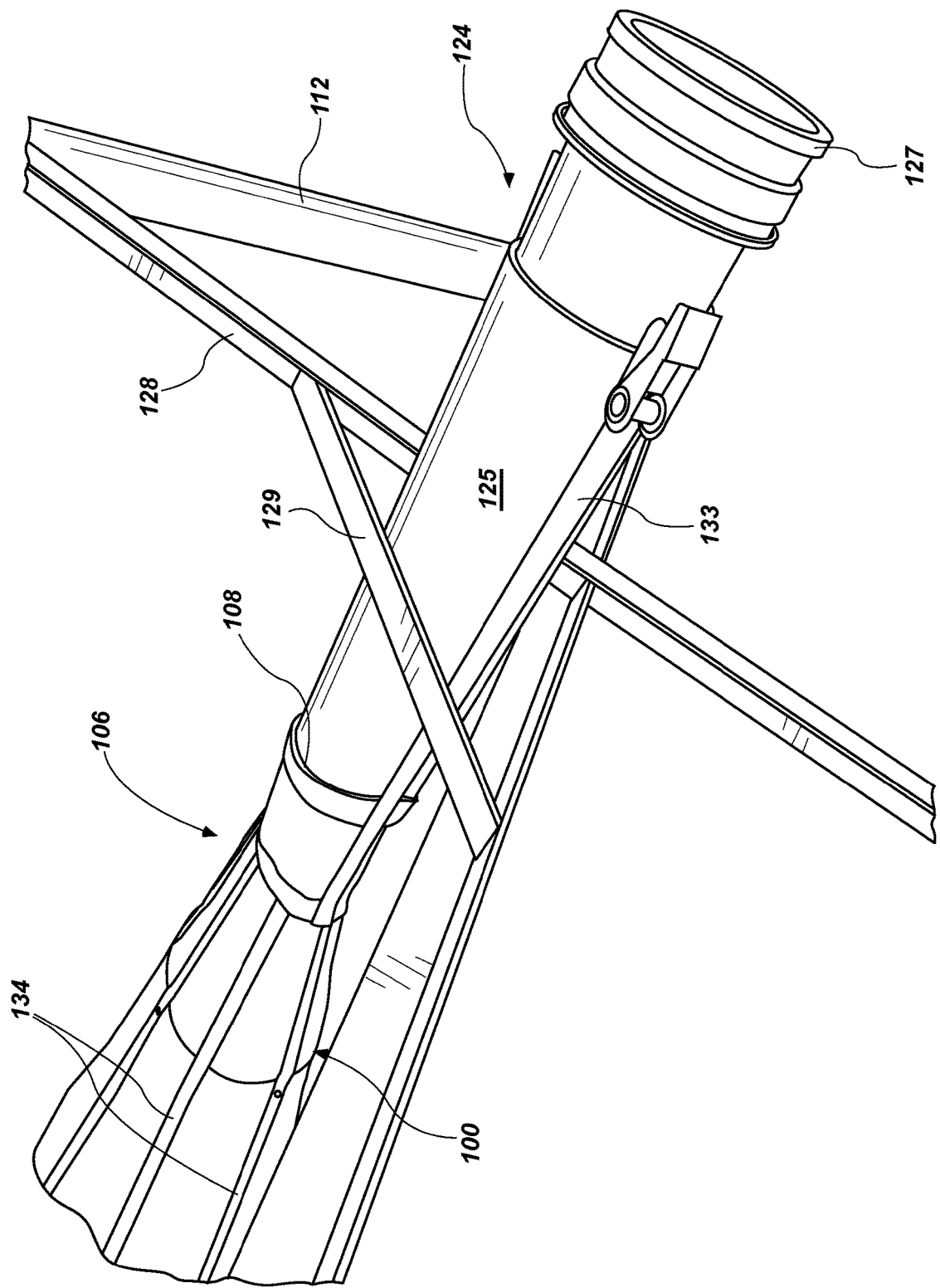
FIG. 5 depicts a coupling according to one embodiment of the present invention.
Figure 8:
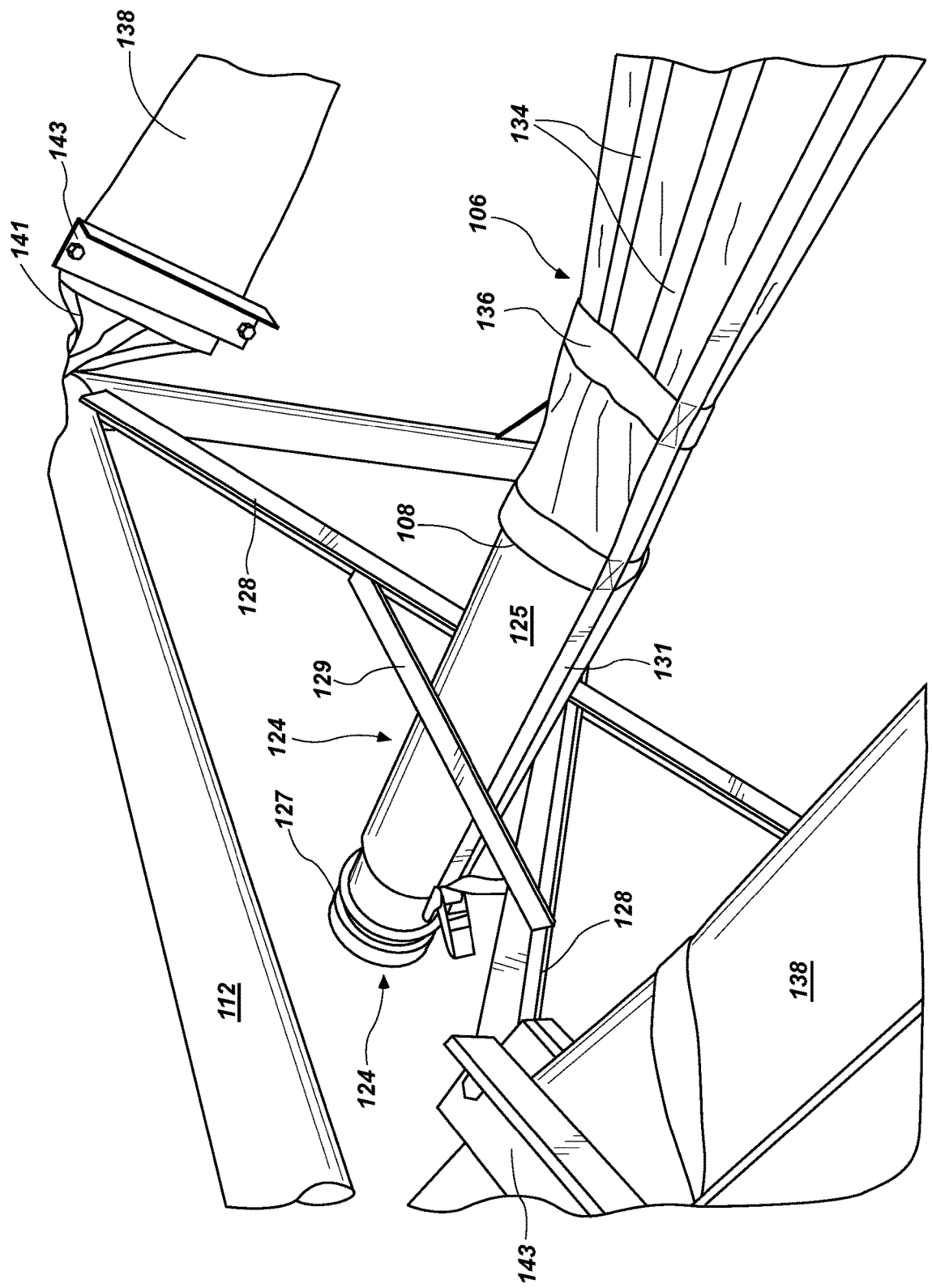
FIG. 8 depicts a coupling and associated framing according to one embodiment of the present invention.

In the present device, the cod end 106 has an opening 108. The opening 108 allows it to be coupled to a conduit 126 (FIG. 3) through a coupling 124 (FIGS. 5 and 8). As best seen in FIG. 8, the coupling 124 can include a rigid section 125 having a fitting 127 on the end thereof. The fitting 127 is easily secured to the conduit 126 with clamps or other known mechanisms. Ratcheting or other types of straps 131, 133 (FIGS. 5 and 8) can also be included to further secure the cod end opening 108 to the coupling 124. However, other known connection mechanisms as would be apparent to one skilled in the art could also be utilized.

As best seen in FIG. 8, the cod end 106 is supported by rear frame 112. In this embodiment, the rear frame 112 includes cross members 128 on which the coupling 124 rests. In the presently illustrated embodiment, support piece 129 can also be included to secure the rigid section 125 of the coupling 124 to the cross members 128 of the frame 112. In this illustration, the support piece 129 is secured with a weld, but could be secured with numerous other means as would be apparent to one skilled in the art including but not limited to straps and adhesives.

The coupling 124 in the presently illustrated embodiment is advantageous because it allows a secure fit but also allows relatively easy removal when desired. However, in some embodiments other forms of coupling may be utilized. For example, the conduit 126 may be secured directly to the cod end opening 108 with straps. In other embodiments, snap or other connectors may be utilized. Numerous other coupling configurations could be utilized provided they allow for fluid communication between the net 100 and the conduit 126.

It is also noted that having the rigid section 125 of the coupling 124 directly secured to the frame 112 at cross members 128 is well suited for the present invention, but is not required. In some embodiments, it may be desirable to have the rigid section 125 loose or free fitting. It is also noted that while the term "rigid" is used to describe the intermediate piece between the cod end opening 108 and the conduit 126, there is no requirement that the intermediate piece actually be any specific rigidity. Any substantially tubular piece that would retain its shape when in use could accomplish this function. It is also noted that the coupling 124 need not even be "tubular"—i.e. substantially round in its cross-sectional shape. It could be a variety of cross-sectional shapes provided it can be joined (directly or by including additional fittings) with the conduit 126 to create a substantially sealed, fluid connection.

Figure 6:
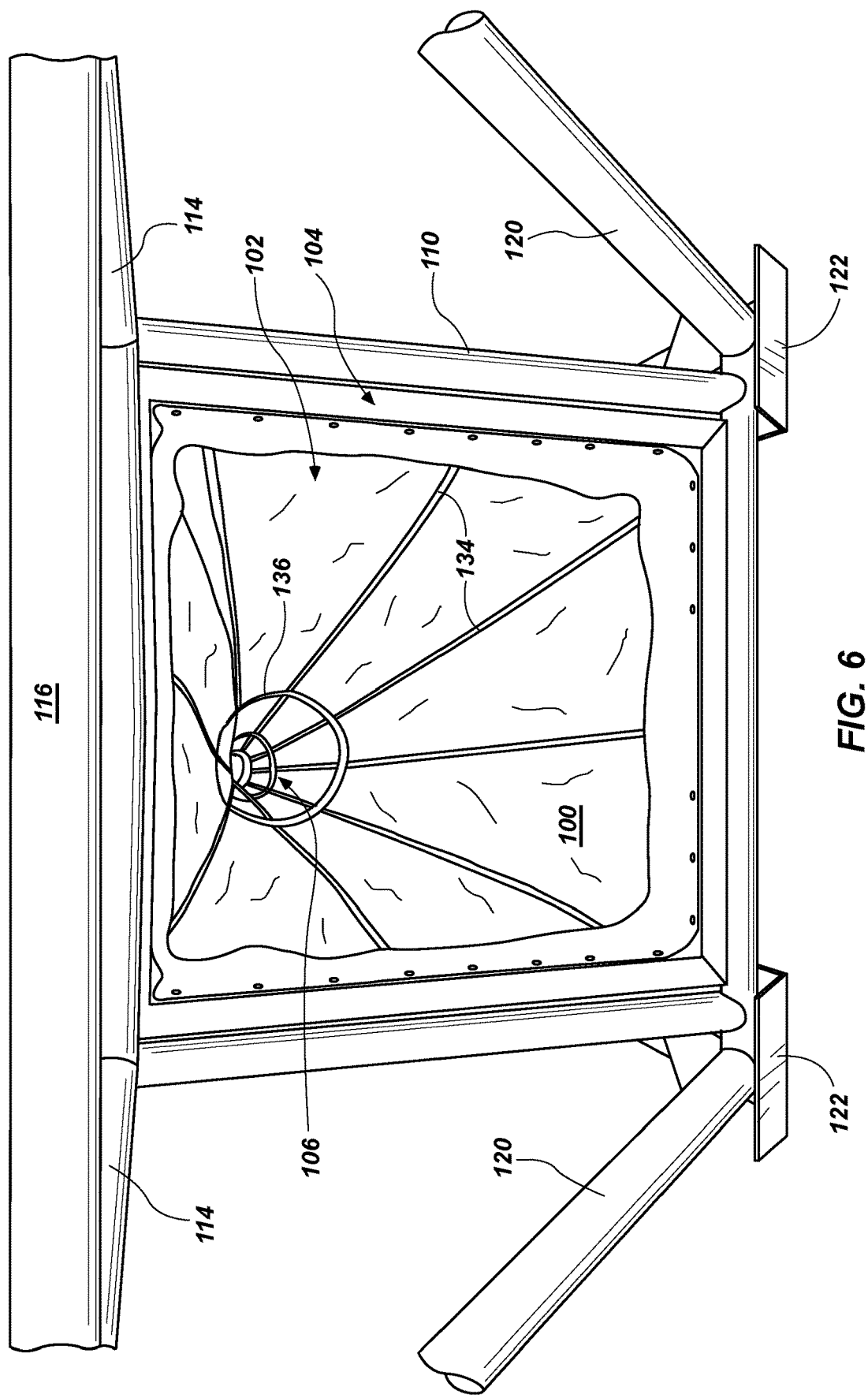
FIG. 6 is a front view of an artemia harvesting device according to one embodiment of the present invention.
Figure 7:
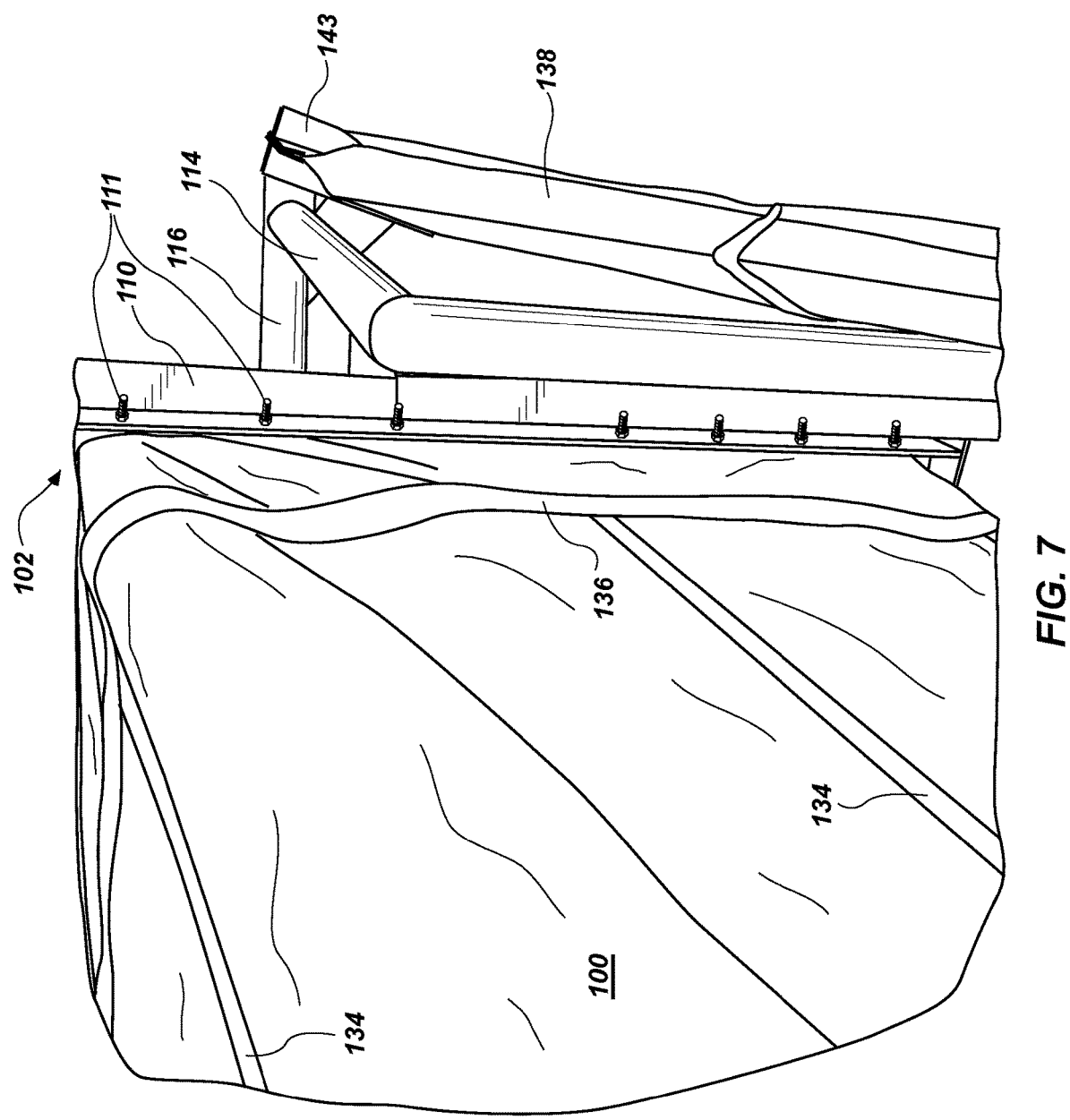
FIG. 7 is a back perspective of certain features of an artemia harvesting device according to one embodiment of the present invention.

Referring particularly now to FIGS. 6 and 7, the first end 102 of net 100 is similarly secured to a support frame 110. In this embodiment, the front support frame 110 is a substantially square frame that conforms to the net opening 104. As best seen in FIG. 7, the net opening 104 can be coupled to the frame 110 with bolts 111. However, numerous other connection mechanisms as would be apparent to one skilled in the art could also be utilized including, but not limited to, straps and adhesives. It is also noted that the front support frame 110 does not need to be square or any particular shape, but should largely conform to the shape of net opening 104.

As seen in FIGS. 1-3 and 14, the front frame 110 and rear frame 112 are connected to one another by a sled frame 118. In the illustrated embodiment, front frame 110 can also include extension arms 114 that intersect with a cross piece 116. Angled arms 120 coupled to the cross piece 116 join the front frame 110 and sled frame 118. Rear frame 112 is also secured to the sled frame 118 by a welded connection, though numerous other securing mechanisms as would be apparent to one skilled in the art could likewise be utilized.

It is noted that the inclusion of the front, rear and sled framing elements allows the net 100 to remain taut when the harvesting device is in use. Specifically, they allow fixed points of attachment for the net 100 at both its front and back ends 102, 106. Ratchet straps 131, 133 allow for further tensioning of the net. A taut net allows for better self-cleaning. In particular, a net for artemia cysts typically must have openings of roughly 200 microns or less. Thus, a net having small enough openings to be effective at catching brine shrimp cysts is very prone to clogs. A loose or dragging net will clog almost immediately, but a taut net allows for better self-cleaning action and thus increased passage of water. It also minimizes sags in the netting where unwanted materials tend to get caught.

The sled frame 118 also is equipped with one or more skids 122. The skids 122 allow the harvesting device to slide over the bottom or sedimentary layer of the body of water in which it is being used without getting bogged down or snagged (see FIG. 14).

Figure 1:
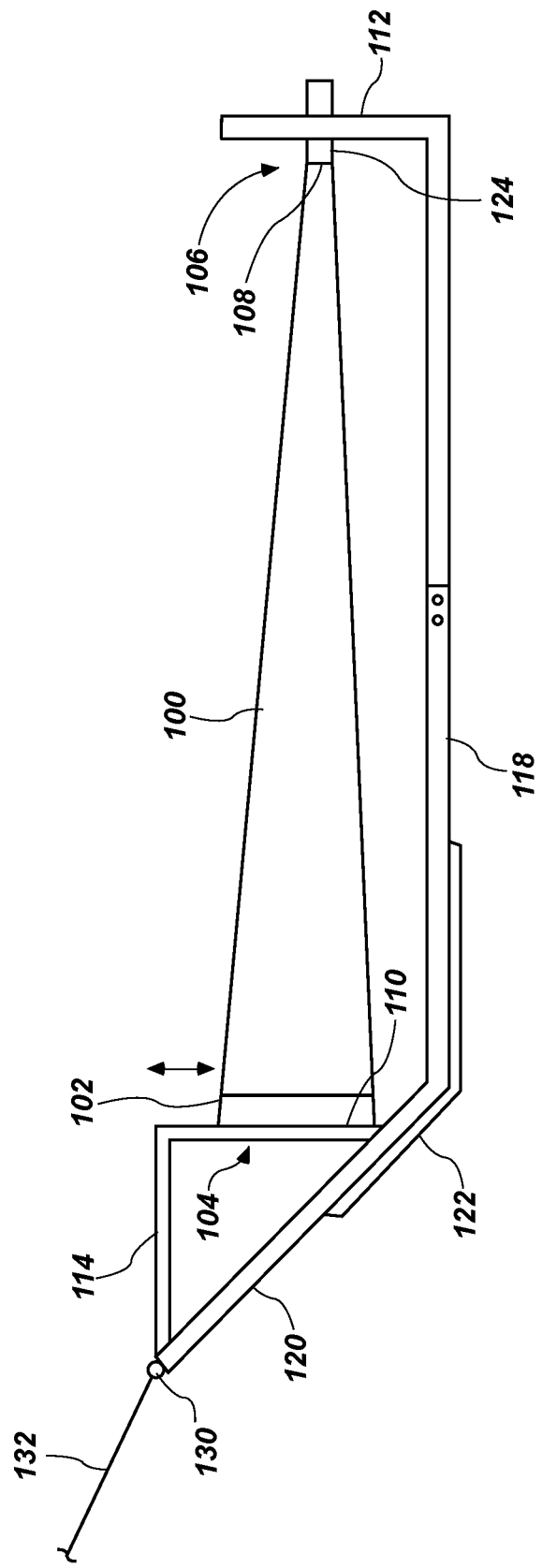
FIG. 1 is a side view of an artemia harvesting device according to one embodiment of the present invention.
Figure 2:
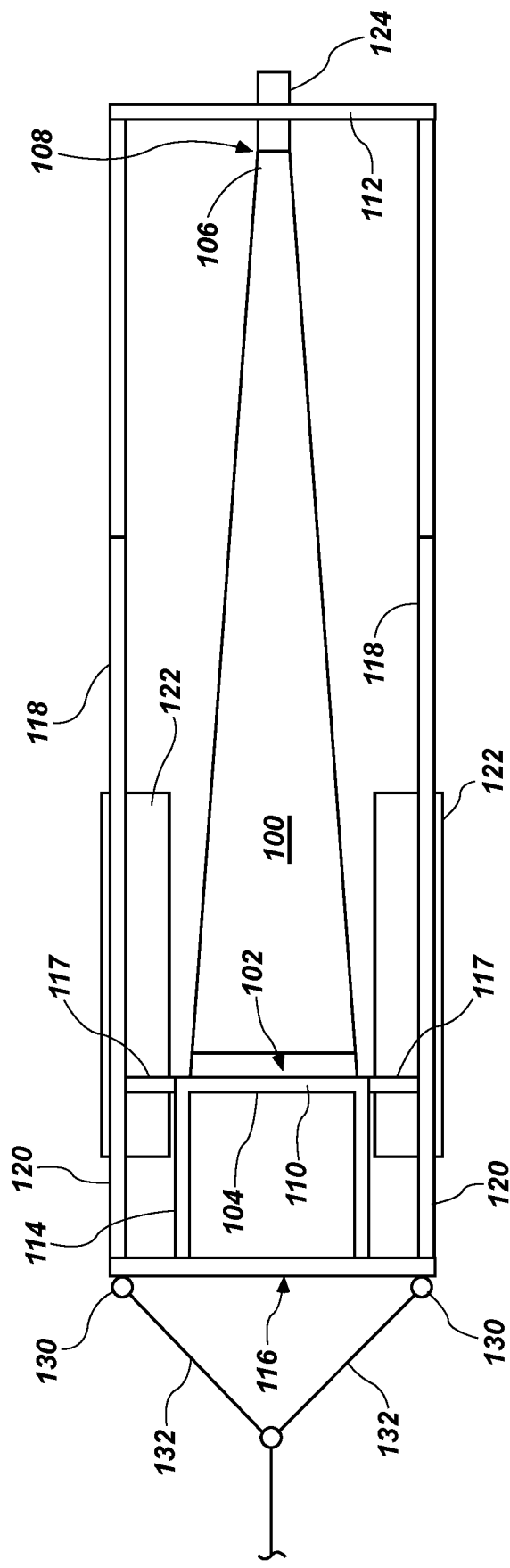
FIG. 2 is a top view of an artemia harvesting device according to one embodiment of the present invention.
Figure 3:
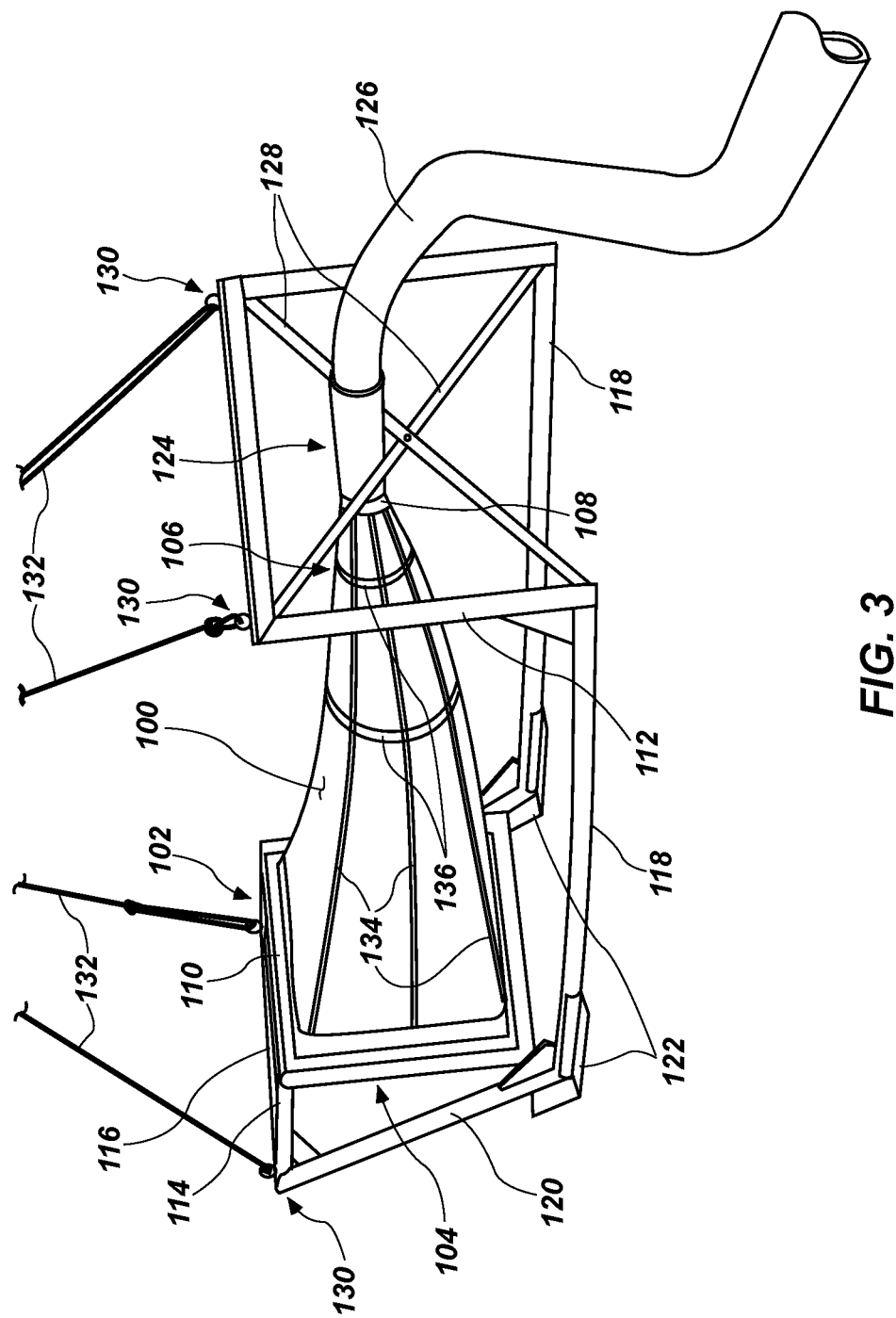
FIG. 3 is a side perspective view of an artemia harvesting device according to one embodiment of the present invention.

Referring to FIGS. 1 and 2, in certain embodiments it may be desirable to include additional space between the front net support frame 110 and the sledding frame 118. In such embodiments, extensions 117 can be included. These are not required, but may be advantageous depending on the circumstances.

Other features that can be included in the harvesting device include one or more connection receptacles 130, which in the illustrated embodiments are eyelets to which one or more cables or ropes 132 can be secured. The cables and/or ropes 132 can be used to hoist the harvesting device into or out of the water. They can also serve as tow lines when the device is being pulled by a vessel.

The nets for zooplankton are fragile and prone to tearing. One additional advantage to the present invention is the inclusion of net panels. As best seen in FIG. 6, reinforcing divides can be included. Longitudinal divides are shown at 134. Circumferential divides are shown at 136. These divides allow damage to the net to be localized, contained and easily repaired without having to change or repair the entire net.

Figure 4:
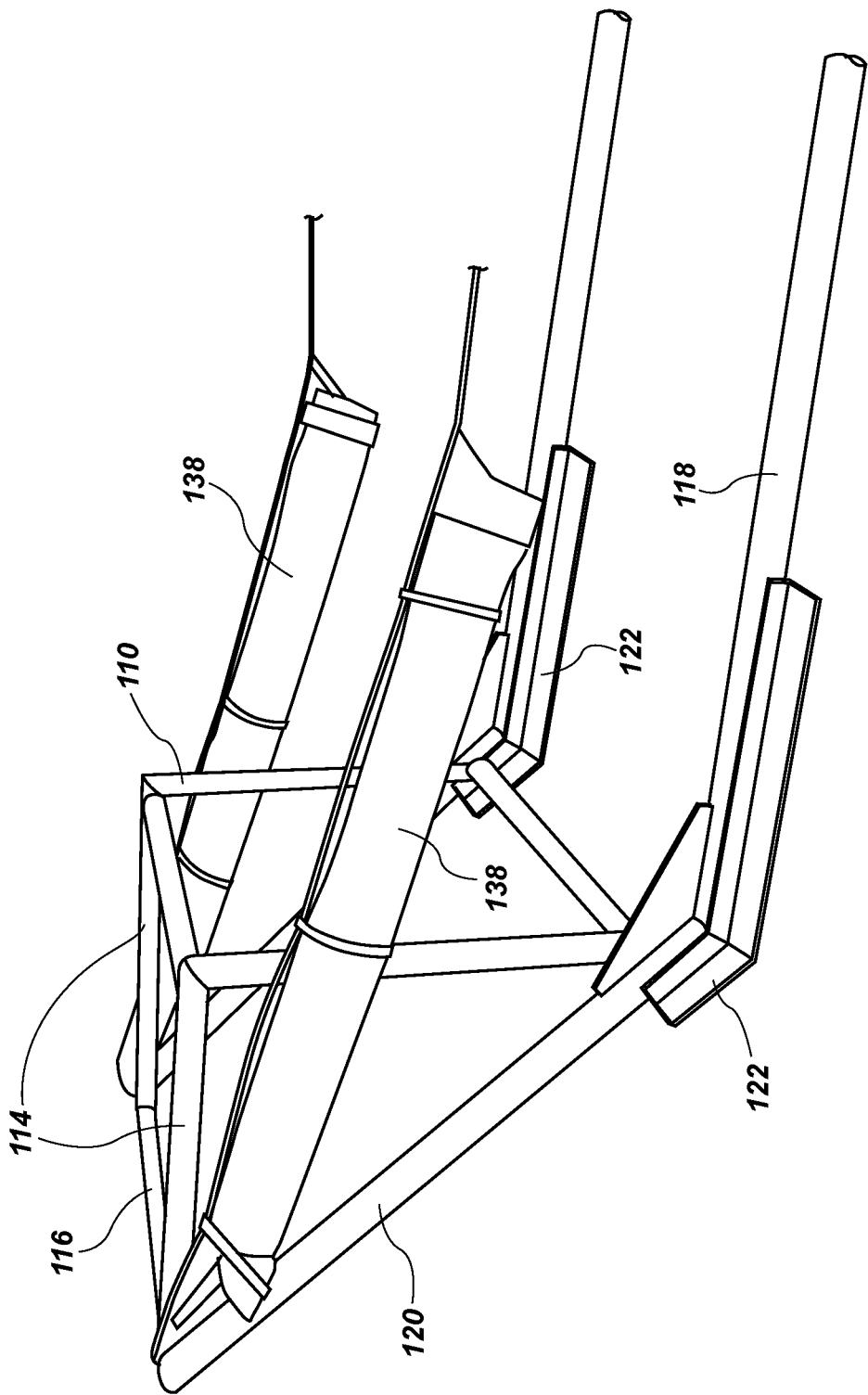
FIG. 4 is a side perspective view of a sledding and flotation feature of an artemia harvesting device according to one embodiment of the present invention.
Figure 15:
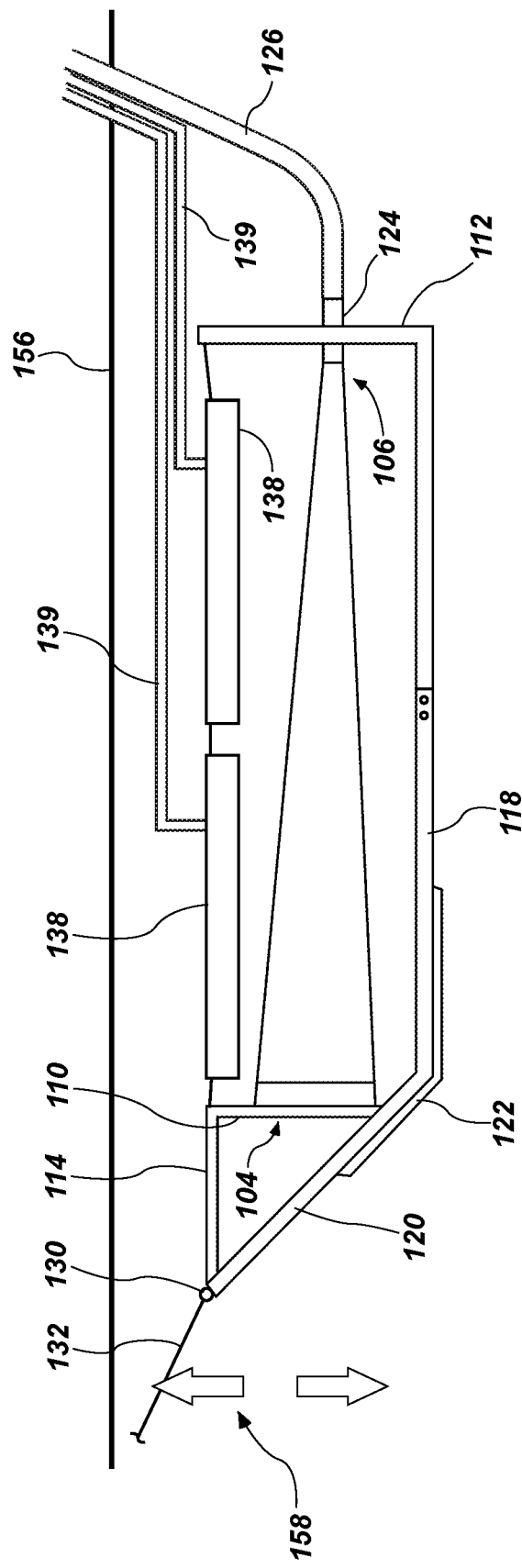
FIG. 15 depicts an artemia harvesting device's capability of changing depth.

As seen in FIGS. 4 and 15, the harvesting device can also include one or more inflation devices 138. The inflation devices 138 are substantially cylindrical inflatable bladders that are secured to the frame with one or more straps 141 or other similar securing mechanisms. In the illustrated embodiment, straps 141 are further secured to inflation devices 138 with braces 143. The inflation devices 138 are in communication with a compressor or similar inflating mechanism via one or more air pressure lines 139 (FIG. 15).

The inflation devices 138 allow two things: First, they allow the net to be moved on the fly to different depths to capture cysts at varying levels—thus, exact depths can be targeted when clusters are located in the water. Second, they accommodate bottom conditions that are less than ideal. Specifically, in some bodies of water the bottom is less stable in certain areas. In these areas, the skids could potentially dig in and get bogged down. The inflation devices 138 allow the entire device to hover very near the bottom. Thus, it can move along harvesting the cysts at that level without getting stuck in the sediment.

In certain embodiments, the inflation devices 138 could be other shapes. For example, they could be substantially spherical or cubical. The cylindrical shape is advantageous as it makes the device more streamlined. However, in some circumstances this may not be as important. The mechanism by which the inflation devices 138 are secured to the harvesting device could also vary. For example, in the illustrated embodiment, the inflation devices 138 are secured with one or more straps 141. However, in other embodiments, the inflation devices 138 could wrap directly around some portion of the front and/or rear frames 110, 112. In some embodiments, the inflation devices could also wrap around some portion of the sled frame 118.

A pump suitable for use with the present invention is a Berkeley B3TQKHS 14.5," though other pumps and pump-configurations that move similar volumes of water could be used. As is discussed further below, to facilitate the flow of the catch through the conduit 126, a nozzle system can be utilized having one or more pump intake lines as well as one or more pump outflow lines.

Figure 9:
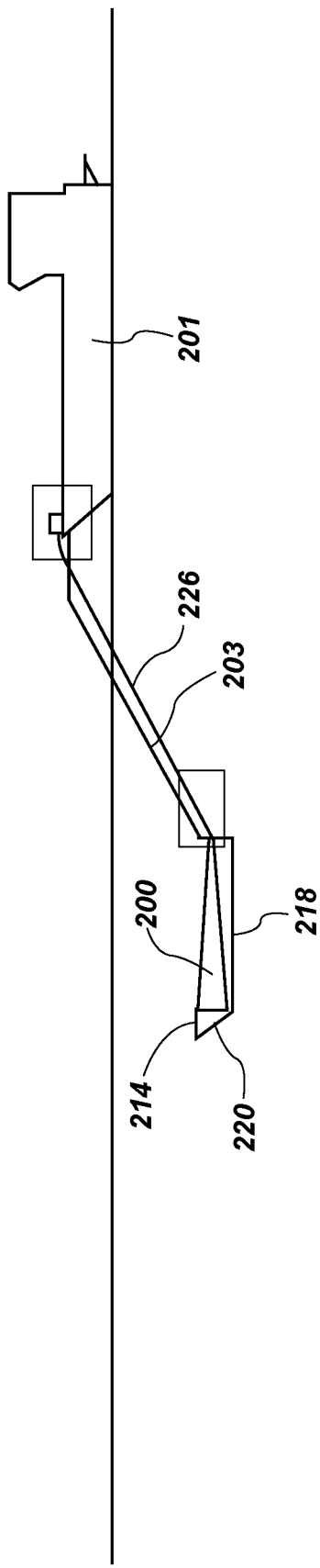
FIG. 9 depicts a pushing transport configuration of an artemia harvesting device according to one embodiment of the present invention.

FIG. 9 illustrates an embodiment where the harvesting device is pushed by a vessel 201 according to one embodiment of the present invention. In this illustration, the harvesting device is similar to those discussed previously herein with a net 200, sled frame 218, angled arms 220 and extension arms 214 (as well as other features not visible at this scale). This embodiment also includes a push bar 203 secured at one end by known means to the harvesting device and at the other end to the vessel 201. Harvesting device is also in communication with vessel through conduit 226 through which it conveys the catch to the vessel 201. The push bar is a substantially rigid bar that can vary in its length, thickness and rigidity. It can also be made of numerous materials as would be apparent to one skilled in the art including but not limited to metal, plastic, wood and combinations thereof.

Figure 10:
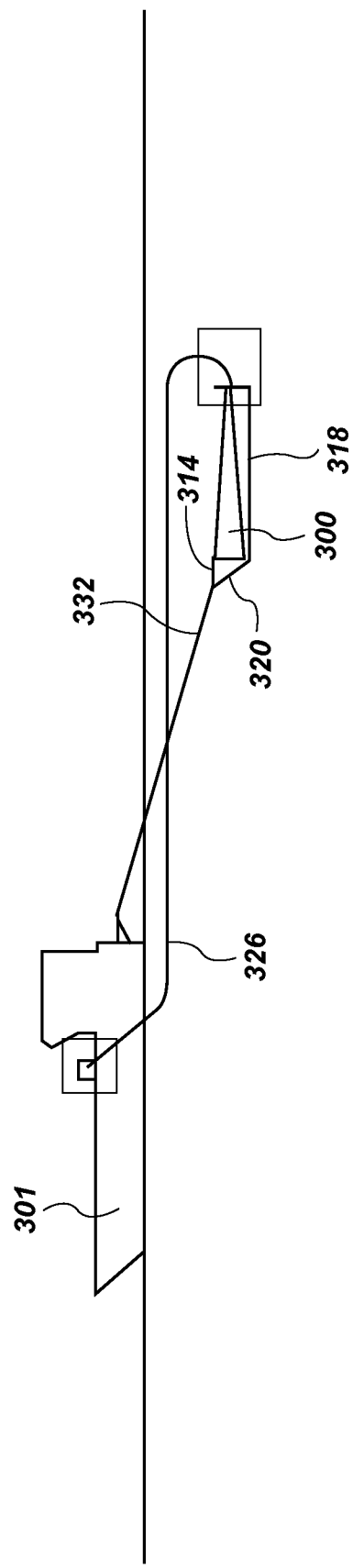
FIG. 10 depicts a towing transport configuration of an artemia harvesting device according to one embodiment of the present invention.

FIG. 10 illustrates an embodiment in which the harvesting device is pulled by a vessel 301 according to one embodiment of the present invention. In this illustration, the harvesting device is similar to those discussed previously herein with a net 300, sled frame 318, angled arms 320 and extension arms 314 (as well as other features not visible at this scale). This embodiment also includes a cable or rope 332 secured at one end by known means to the harvesting device and at the other end to the vessel 301. Harvesting device is also in communication with vessel through conduit 326 through which it conveys the catch to the vessel 301. The cable or rope 332 can vary in its length and thickness. It can also be made of numerous materials as would be apparent to one skilled in the art including but not limited to steel, nylon, natural fibers and combinations thereof.

Figure 11:
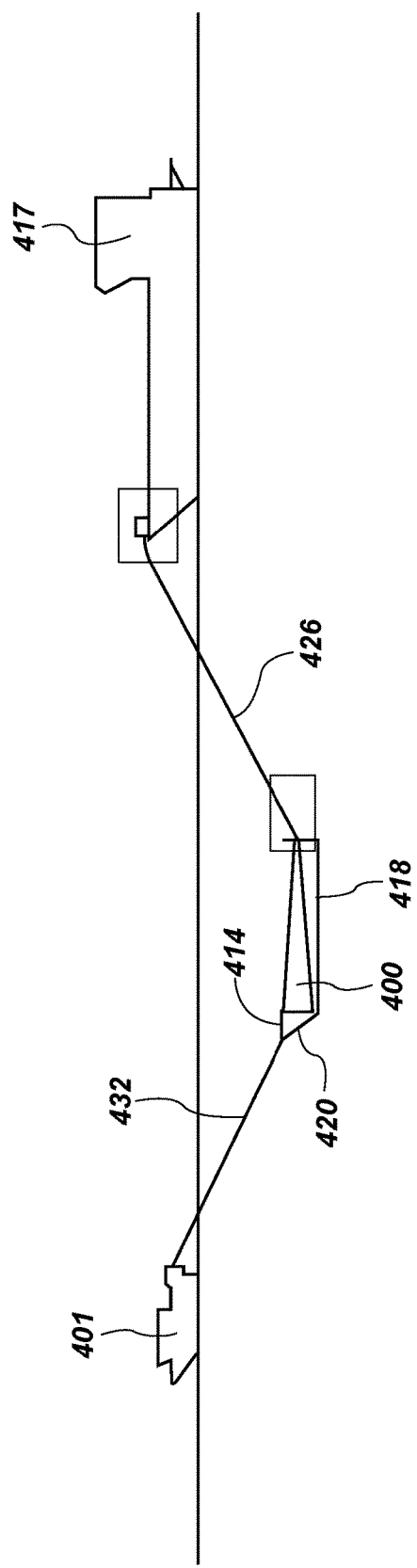
FIG. 11 depicts another pulling transport configuration of an artemia harvesting device according to one embodiment of the present invention.

FIG. 11 illustrates an embodiment where the harvesting device is towed by a towing vessel 401, but the catch is drawn up onto a separate harvesting vessel 417. Again, the harvesting device is similar to those discussed previously herein with a net 400, sled frame 418, angled arms 420 and extension arms 414 (as well as other features not visible at this scale). This embodiment also includes a cable or rope 432 secured at one end by known means to the harvesting device and at the other end to the towing vessel 401. Harvesting device is also in communication with harvesting vessel 417 through conduit 426 through which it conveys the catch to the vessel 417. The cable or rope 432 securing the harvesting device to the towing vessel 401 can vary in its length and thickness. It can also be made of numerous materials as would be apparent to one skilled in the art including but not limited to steel, nylon, natural fibers and combinations thereof.

Figure 12:
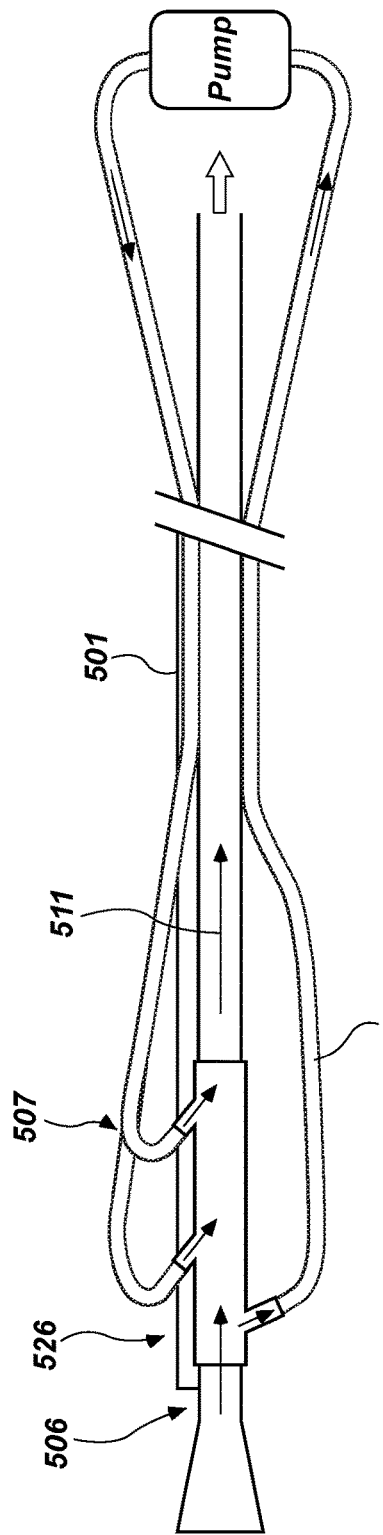
FIG. 12 schematically represents a pumping configuration for an artemia harvesting device according to one embodiment of the present invention.

FIG. 12 illustrates a nozzle feature that can be utilized in connection with certain embodiments of the present invention. Specifically, in current artemia harvesting practices, low flow pumps are generally utilized. Such pumps may not have sufficient flow to effectively draw the catch from the cod end of the net under the present invention and convey it to the harvest vessel. By utilizing a nozzle system, low flow pump performance can be enhanced to make then perfectly adequate for use with the presently described system. The nozzle feature draws the slurry of water and brine shrimp cysts from the cod end opening 506 and directs it through one or more pump intake supply lines 509. The slurry is then pumped back into the conduit 526 through one or more pump outflow and restricted jet nozzles 507. In this manner, flow through the conduit is accelerated creating a pressurized jet that then multiplies the flow depicted at arrow 511. Such pump lines can also be bundled with air lines for inflation devices (e.g. 138 as discussed previously herein).

It is also noted that with the nozzle system, no external water source is used. In other words, running the slurry directly through the pumps means the slurry is not being diluted with outside water. Thus, no additional pumps need to be purchased in order to utilize the present invention. Moreover, because no additional water is being introduced, no addition drying time or effort is needed thereby improving efficiency.

While the presently described nozzle system has advantages, it is not required for the invention. In some embodiments, a user could just utilize a higher flow pump that was purchased for that purpose.

Figure 13:
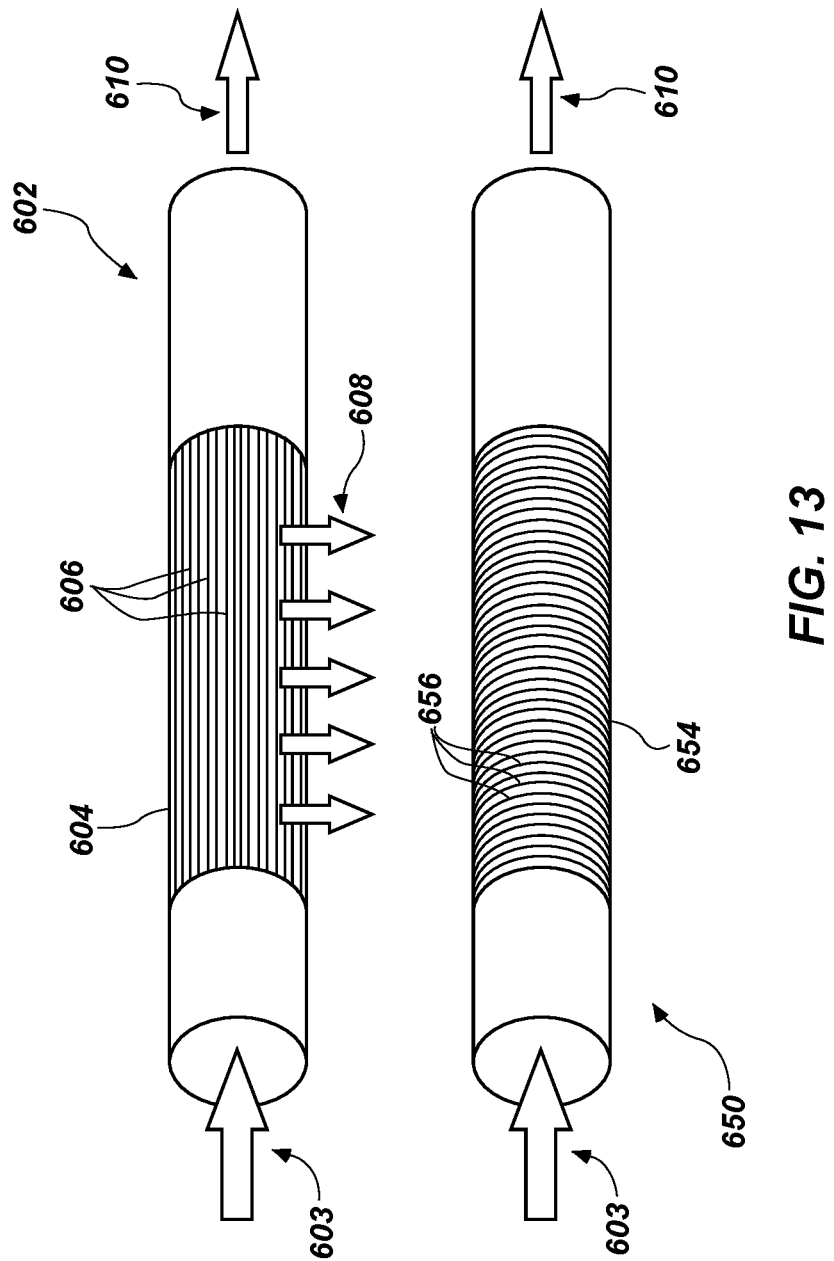
FIG. 13 depicts dewatering attachments according to certain embodiments of the present invention.

FIG. 13 is a depiction of two dewatering attachments 602, 650 that can be utilized in combination with certain embodiments of the present invention. Specifically, once the brine shrimp cysts are extracted from the cod end of the net as discussed above, they are typically deposited on a harvesting vessel as a brine shrimp cyst/water slurry where dewatering takes place as part of the harvesting process. Typically, this is done by depositing the slurry in one or more harvest bags that retain the cysts, but allow the water to flow out.

Dewatering attachments 602 and 650 can allow for reduced dewatering time on the vessel. Attachment 602 utilizes a wedge wire cylinder 604 that can be placed in line with the conduit (e.g. 126). The wedge wire cylinder 604 includes a plurality of radially oriented wires 606 that allow water 608 to pass through while retaining the catch. Thus, the slurry depicted at arrow 603 enters attachment 602 and is at least partially dewatered. The reduced water slurry depicted at arrow 610 can then be transported to harvest bags or other known dewatering techniques.

In yet another embodiment depicted at 650, the wedge wire cylinder 654 includes axially oriented wire 656. It similarly allows water 608 to pass through while retaining the catch. Thus, the slurry depicted at arrow 603 enters attachment 650 is dewatered and then the reduced water slurry depicted at arrow 610 can then be transported to harvest bags or other known dewatering techniques.

In some embodiments, both radially and axially oriented wire cylinders may be utilized. Additionally, other dewatering devices could be used such as a continuous flow centrifuge, vibrating screens etc.

Figure 14:
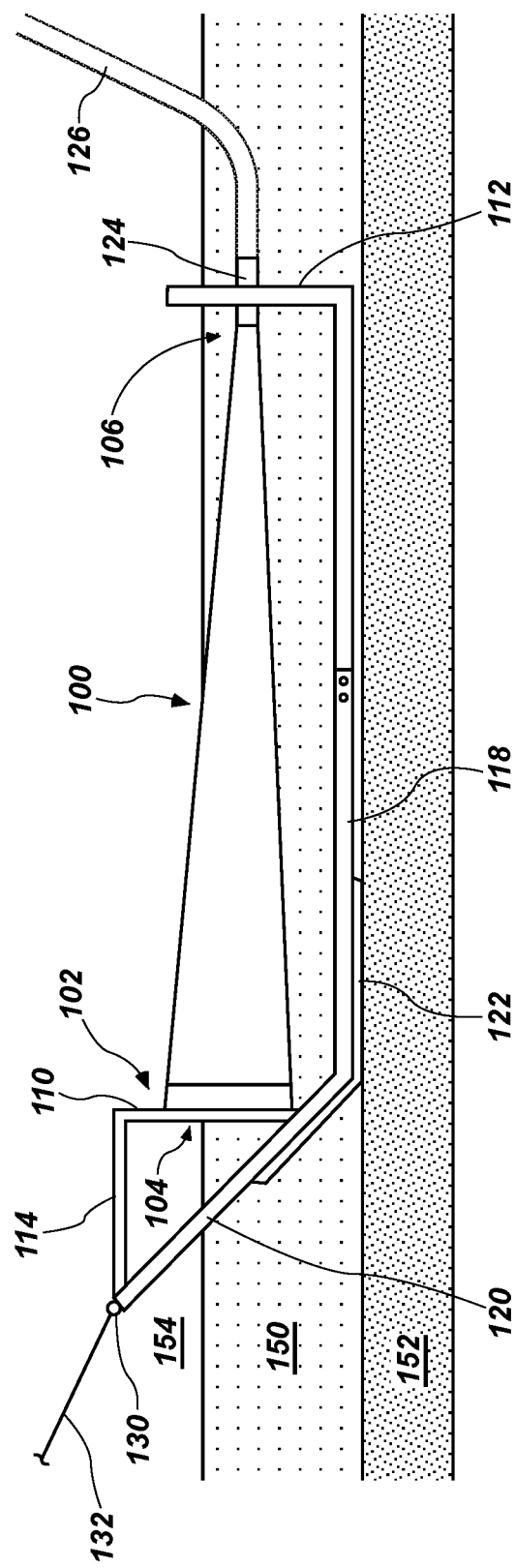
FIG. 14 depicts an artemia harvesting device at the deep brine level.

Referring now to FIG. 14, the present device is depicted harvesting at the deep brine layer 150. Whether pushed or pulled, skids 122 allow the device to move across the lake bottom 152 while the net opening 104 substantially aligns with the deep brine layer 150 (though in the present illustration, there is also with some overlap in the epilimnion layer 154).

FIG. 15 illustrates how the depth of the harvest device can vary with the present device when equipped with inflation devices 138. In particular, as inflation devices 138 are filled with air or other suitable gases through air pressure lines 139 that, in this embodiment, are depicted bundled with conduit 126, the harvest device will rise closer to the water surface 156. When the gases are released, the harvesting device drops deeper. The rising and falling of the harvest device in conjunction with inflation and deflation of the inflation devices 138 is depicted with arrows 158. The different buoyancies of the harvesting device allow a user to adjust its location in the water column on the fly allowing for maximum harvest yield specific to the circumstances.

VARIATIONS

It is noted that the discussion above has focused primarily on harvesting brine shrimp. However, the present invention is not intended to be limited to any particular catch. While the greatest presently known utility is in the context of artemia, the invention could also be utilized to harvest other small aquatic organisms including but not limited to various zooplankton species.

In the illustrated embodiment, the support frames 110, 112 and sledding frame 118 are described separately. However, it is noted that they do not need to necessarily be distinct elements. For example, in certain embodiments they could be a single integrated piece.

The support frames 110, 112 could accommodate wide variety of net shapes. "Conical" is not intended to be limited to specific geometric shape. Rather, any three dimensional net having an opening at one end and that narrows as it approaches the other end is considered "conical" for purposes of the present invention. The degree of tapering could vary widely depending on circumstances and preferences. However, as noted above, an aspect ratio of at least 4:1 is preferred for its self-cleaning characteristics.

The front frame 110 is described above as being substantially square in shape, but could be other shapes including but not limited to substantially circular, oval or polygonal.

The frame (sledding and net support) can be made of a variety of materials. Aluminum is suitable because it is relatively strong, lightweight and resistant to corrosion in the salty environments where used. Numerous other materials could also be utilized including but not limited to steel, wood, composites and carbon fiber alone or in combination.

The skids 122 shown are angular in their orientation, but could also be rounded—as could the corresponding sledding frame/arms 118, 120. In one embodiment, the skids 122 have a width of approximately 0.3 meters. However, in some circumstances wider or narrower skids can be utilized. The skids 122 and sledding frame 118 can similarly be made from a variety of materials including but not limited to aluminum, steel, wood, composites and carbon fiber alone or in combination. Low friction materials or coatings are also well suited for use in connection with the skids 122.

The net can be made of numerous materials including, but not limited to nylon, organic polyamides and wire. It is also noted that as used herein "net" does not necessarily mean a fibrous net as the term is widely known. A net could also be a screen, cloth, fabric or other semi-permeable material that allows water to pass through but that largely retains a catch.

The relative positioning of the net 100 to the skids 122 may also be varied according to need and circumstance. In particular, it may be desirable in some situations to have a fairly wide space between the skids and therefore the bottom and the net opening 104. In some embodiments, the net support frame could be adjustable.

Figure 16:
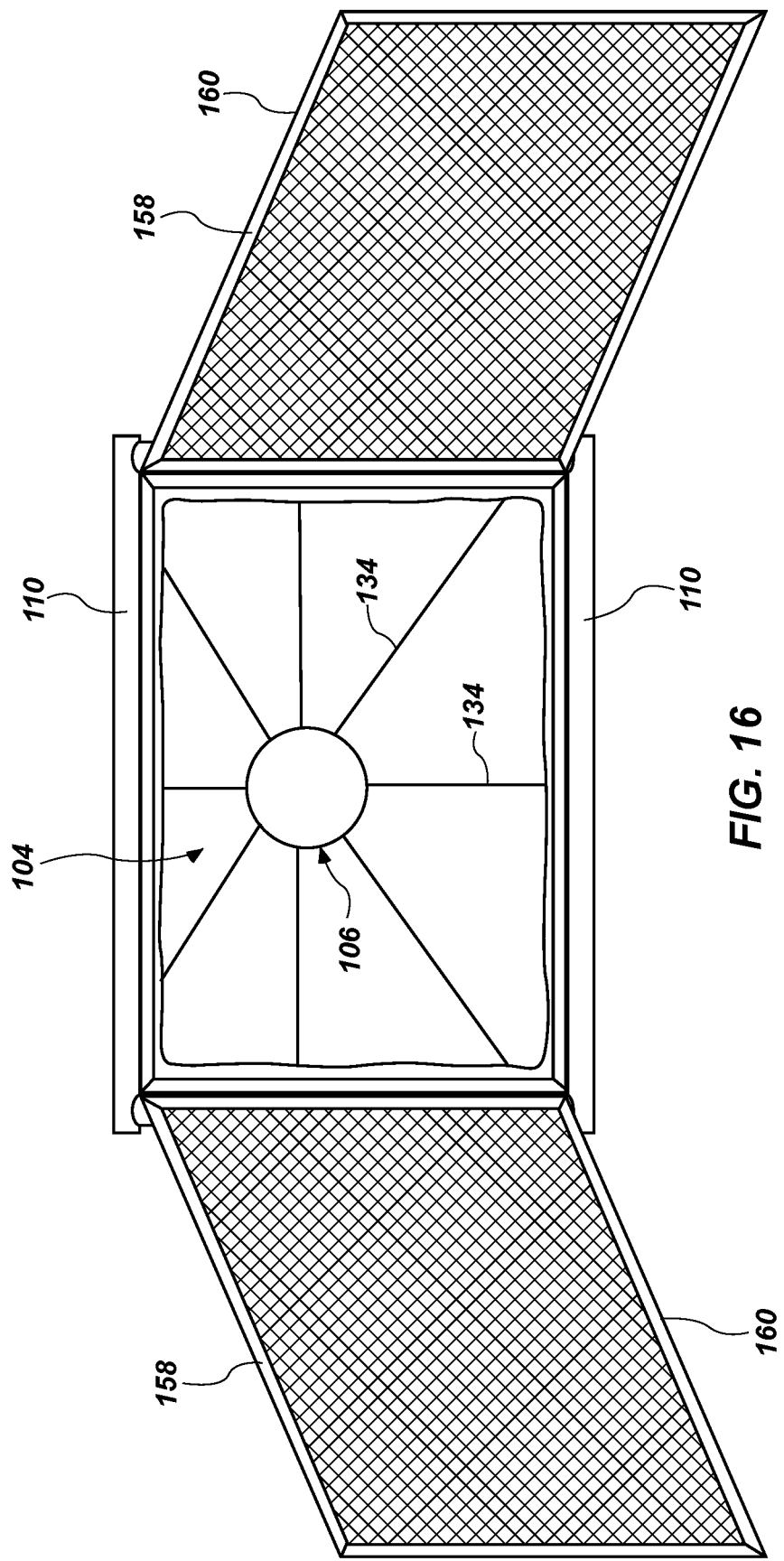
FIG. 16 depicts a net opening equipped with wings according to one embodiment of the present invention.

As depicted in FIG. 16, the harvesting device can be outfitted with protruding wings 158 at opening 104 made with similar screening material or other material which would help guide the cyst accumulations towards the open end of the harvesting device. In this embodiment, opening 104 is also depicted having different dimensions—namely, the width of the opening 104 is larger but the depth is smaller. Such a configuration can be advantageous in certain circumstances as it allows the harvest device to cut a wider swath when harvesting—especially in combination with wings 158. Wings 158 in this illustration include framing 160 that can itself be coupled to frame 110. In some embodiments, the coupling is hinged allowing the wings 158 to be open and shut. In other embodiments, the wingspan is fixed.

Figure 17:
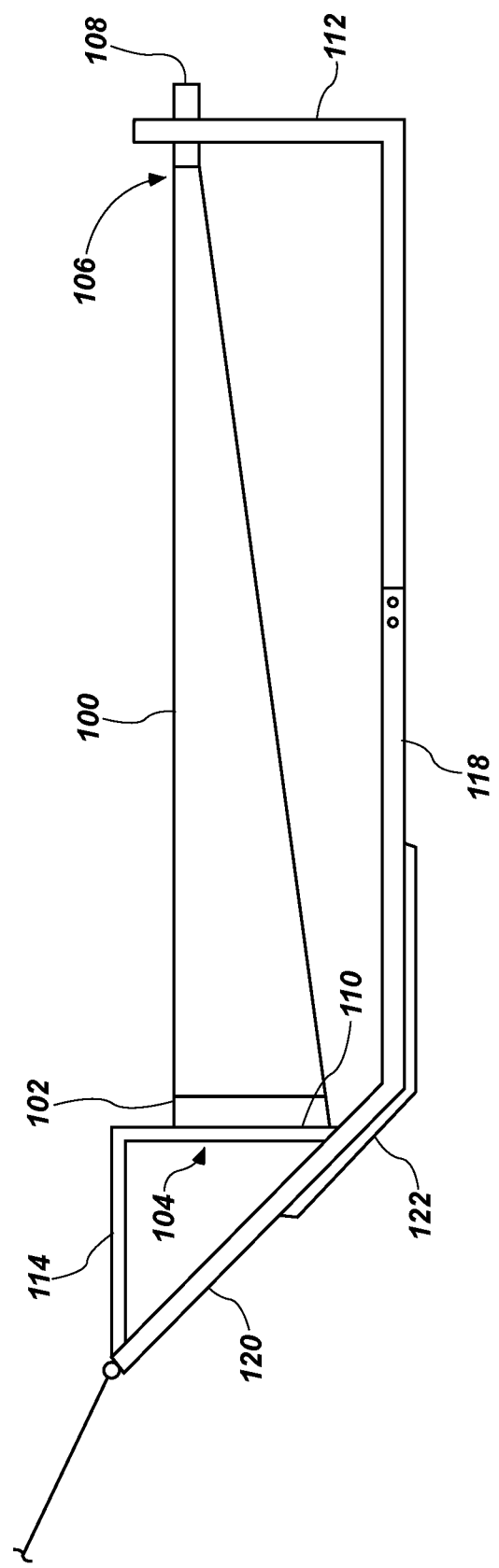
FIG. 17 depicts an artemia harvesting device with a different net configuration according to one embodiment of the present invention.

In yet other embodiments, the relative orientation of net 100 could be altered with the upper portion substantially horizontal and the lower portion angled as depicted in FIG. 17. In some circumstances, the cysts have a tendency to float. Thus, a net that tapers downward can create a friction point where cysts and other debris tended to accumulate. Such a net orientation can improve the flow of material towards the back of the net.

Figure 18:
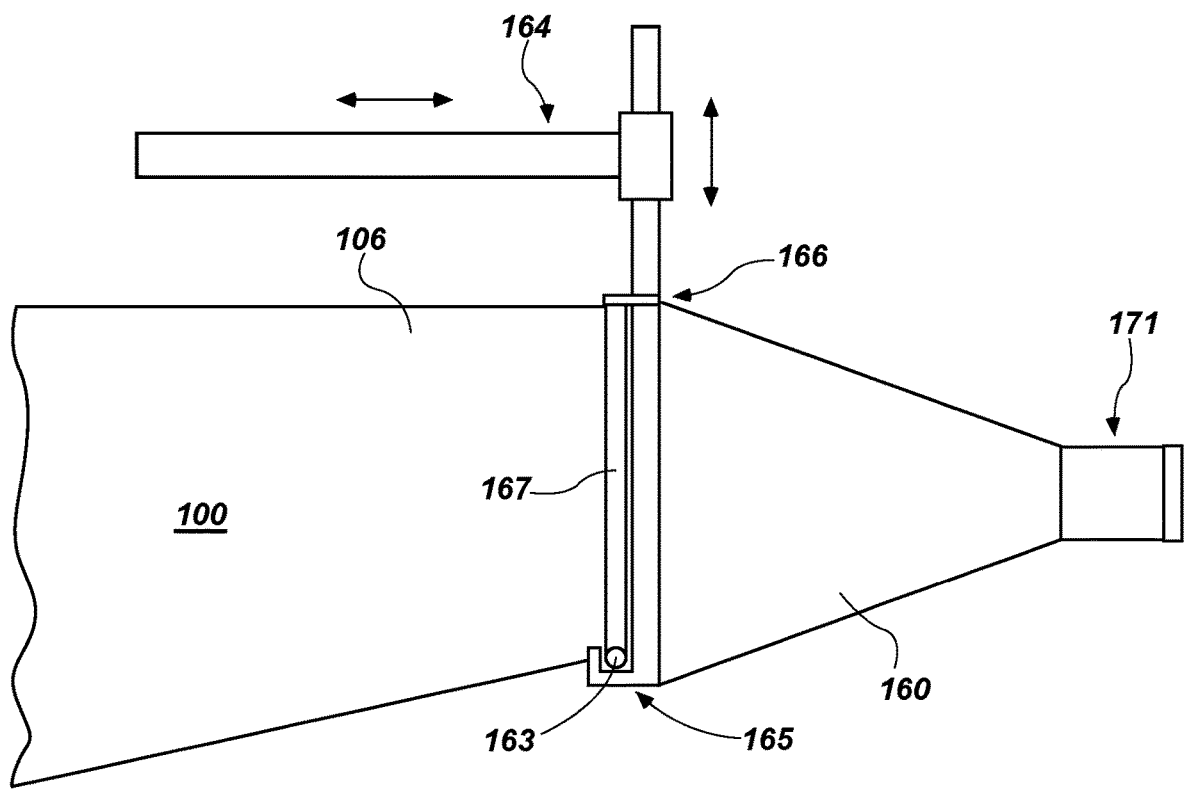
FIG. 18 depicts a side view of a coupling according to one embodiment of the present invention.
Figure 19:
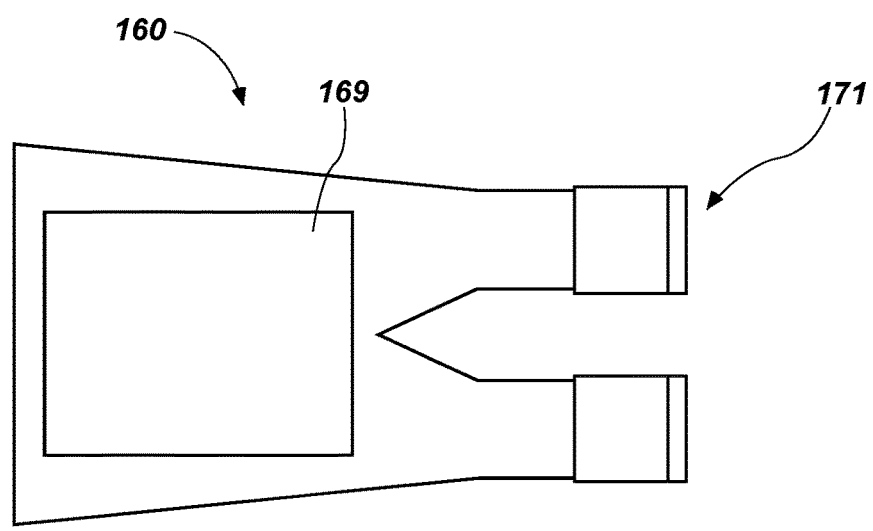
FIG. 19 depicts a top view of a coupling according to one embodiment of the present invention.
Figure 20:
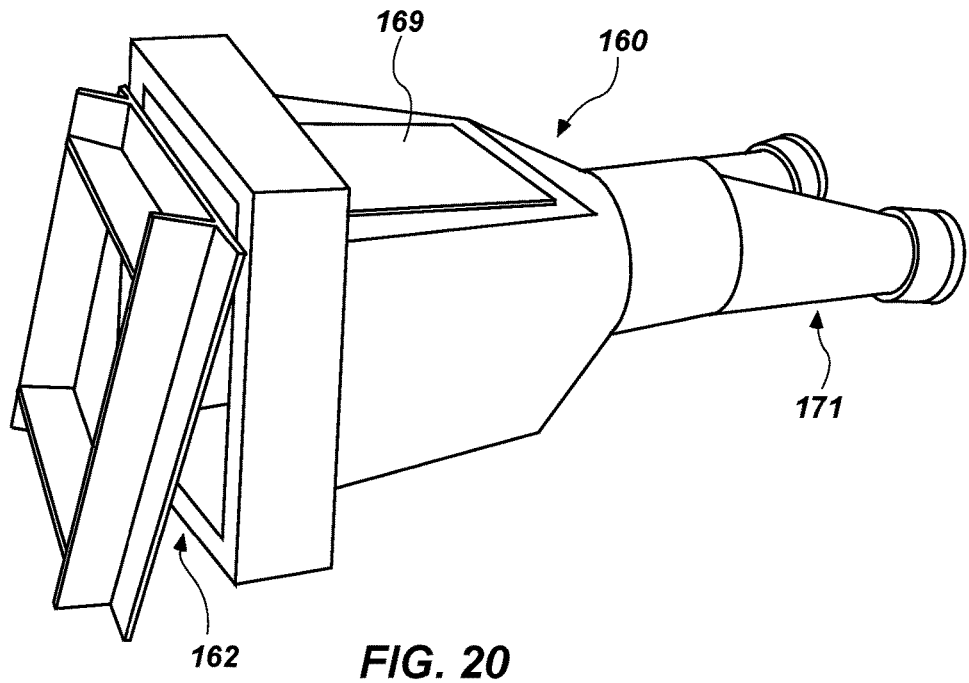
FIG. 20 depicts a side perspective view of a coupling according to one embodiment of the present invention.

FIGS. 18-20 depict an alternate coupling 160 for the cod end 106 to be secured to a conduit (e.g. 126). This coupling 160 includes an opening 162 (FIG. 20) that can be secured to the cod end 106 of a net 100. In one embodiment, the cod end 106 is secured to coupling 160 by inserting a lower locking pin 163 on a cod end frame 167 into groove 165 and securing the opposite end with latch 166. A tensioner 164 can also be utilized to pull the net tight in the harvest device. In some embodiments, the cod end 106 can be enlarged to improve flow.

Other attachment mechanisms can also be used to secure net 100 to coupling. For example, in certain embodiments, a frame fitting is utilized where the cod end 106 is essentially sandwiched between a male frame piece and a corresponding female frame piece which are then secured with known fastening mechanisms. For example, the cod end 106 could be slipped through a substantially square shaped inner frame section (not shown) and wrapped around the edges of the inner frame (similar to how embroidery hoops work) and inserted into outer frame opening 162 as seen in FIG. 20. The inner and outer frames could be further secured together with a variety of known mechanisms including, but not limited to clamps and nuts and bolts thereby locking the cod end 106 in place.

As best seen in FIGS. 19 and 20, coupling 160 can include an access door 169 allowing a user to clean out debris and clogs as needed. Coupling 160 is also depicted having two outputs 171 that can be coupled to one or more conduits (e.g. 126). In certain embodiments, it may be desirable to have more or fewer outputs and all are considered to be within the scope of the present invention.

Figure 22:
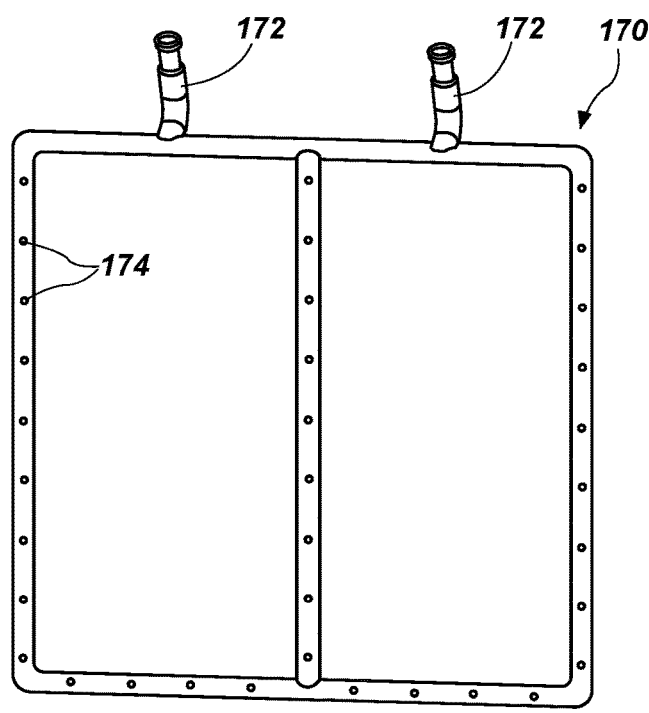
FIG. 22 depicts a net opening pumping mechanism according to one embodiment of the present invention.

In yet other embodiments, additional pumps could be installed at various points along the net 100. For example, as seen in FIG. 22, a pumping mechanism 170 could be secured substantially at the net opening 104. Water can be directed into pump through hoses (not shown) coupled to nipples 172. Pumping mechanism 170 in this embodiment is perforated conduit. As water enters pumping mechanism 170 it is forced out perforations 174 creating a nozzle effect which helps push the netted harvest to the cod end 106 of the net 100. In one embodiment, the pumping mechanism 170 is made out of polyvinyl chloride (PVC) pipe. However, in other embodiments, it may be advantageous to utilize other conduit materials including but not limited to acrylonitrile butadiene styrene (ABS) pipe, rubber or plastic hosing or combinations of the same. Nipples 172 are quick connect hose couplings but could be other known hose connection mechanisms as would be apparent to one skilled in the art.

Figure 21:
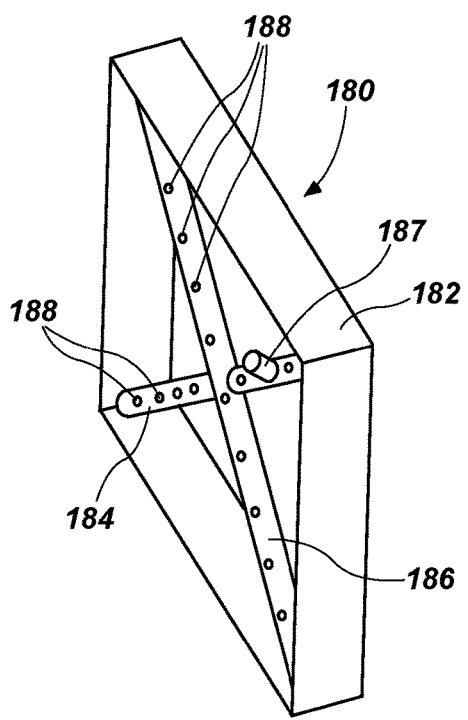
FIG. 21 depicts an internal net pumping mechanism according to one embodiment of the present invention.

Similarly, FIG. 21 depicts a pumping mechanism 180 that can be placed deeper into the net 100 but have generally the same effect as mechanism 170. In the illustrated embodiment, pumping mechanism 180 includes an outer frame 182 with cross members 184, 186. Cross members 184, 186 are again perforated conduits that could be made from a variety of materials including, but not limited to, PVC, ABS, hosing or combinations thereof. Cross member 184 includes a nipple 187 that, in this embodiment, is a quick connect hose coupling allowing water to be directed into to the pumping mechanism 180 and forced out through perforations 188 creating a nozzle effect and helping push the netted harvest to the cod end 106 of the net 100. In certain embodiments, additional structural supports for sprayers and hoses can also be added inside the net.

As noted above, dewatering mechanisms on the harvest vessel are used to shed additional water and further concentrate the slurry. Additionally, the vessel can also be equipped with separating screens or hydro cyclones in order to separate brine shrimp cysts from non-cyst material.

With the present device, it may be necessary to modify the harvest bags on the vessels to accommodate the larger volume of water that passes through the system. In particular, in typical harvesting activities, 1000-micron harvest bags are used. However, in certain conditions, it is preferable to include a smaller mesh bag inside the primary harvest bag. In one embodiment, a 200-micron mesh bag is placed inside the 1000-micron bags. While the 200-micron bags can tear easily, the 1000-micron bag on the outside provides reinforcement and also makes it usable with standard hooks, supports, and other equipment.

In yet other embodiments, the net 100 can be equipped with a mesh backing on the outside to give it additional strength. A one-inch mesh has been found to provide favorable results, but other mesh sizes could be utilized. The net 100 can also be modular to allow for easier repair. For example, the net 100 can utilize zippered panels so that it is possible to change out a damaged section rather than the entire net. In some embodiments, a large mesh screen can be placed at the net opening 104 to keep out larger debris.

What is claimed is:

1. A device for harvesting artemia cysts comprising:
   a) a front support frame;
   b) a first angled arm and a second angled arm coupled to the front support frame;
   c) a rear support frame having one or more cross members and a support piece;
   d) a net having a first open end and a second open end, wherein the first open end of the net is secured to the front support frame and wherein the first open end of the net conforms to the front support frame;
   e) a coupling secured to the rear support frame having a first coupling end and a second coupling end, wherein the first coupling end is in communication with the second open end of the net;
   f) a conduit having a first conduit end attached to the second coupling end and a second conduit end in communication with a dewatering system;
   g) one or more straps securing the second open end of the net to the coupling, whereby the net remains substantially taut and wherein the net has an aspect ratio of at least approximately 4:1;
   h) a sledding frame coupled to the first and second angled arms and the rear support frame;
   i) one or more skids coupled to the sledding frame; and
   j) a first inflation device coupled at a first end thereof to the first angled arm and at a second end thereof to the rear support frame.

2. The device of claim 1, wherein the first conduit end is coupled to the second coupling end with a fitting.

3. The device of claim 1, wherein the one or more straps are ratcheting straps.

4. The device of claim 1, wherein the coupling is supported from beneath by the one or more cross members of the rear support frame.

5. The device of claim 1, wherein the coupling is secured from above by the support piece.

6. The device of claim 1, further comprising a second inflation device coupled at a third end thereof to the second angled arm and at a fourth end thereof to the rear support frame.

7. The device of claim 6, further comprising an air pressure line in communication with the first inflation device and the second inflation device.

8. A device for harvesting artemia cysts comprising:
   a) a front support frame;
   b) a first angled arm and a second angled arm coupled to the front support frame;
   c) a rear support frame;
   d) a net having a first open end secured to the front support frame, wherein the first open end of the net conforms to the front support frame, and a second open end;

e) a coupling secured to the rear support frame, having a first coupling end and a second coupling end, wherein the first coupling end is in communication with the second open end of the net;
f) a conduit having a first conduit end attached to the second coupling end and a second conduit end in communication with a dewatering system;
g) a sledding frame coupled to the first and second angled arms and the rear support frame;
h) one or more skids coupled to the sledding frame;
i) a first inflation device coupled at a first end thereof to the first angled arm and at a second end thereof to the rear support frame;
k) a second inflation device coupled at a third end thereof to the second angled arm and at a fourth end thereof to the rear support frame; and
l) an pressure line in communication with the first inflation device and the second inflation device.

9. The device of claim 8, further comprising one or more straps securing the second open end of the net to the coupling, whereby the net remains substantially taut and wherein the net has an aspect ratio of at least approximately 4:1.

10. The device of claim 9, wherein the one or more straps are ratcheting straps.

11. The device of claim 8, wherein the rear support frame further comprises one or more cross members and a support piece.

12. The device of claim 11, wherein the coupling is supported from beneath by the one or more cross members of the rear support frame and wherein the coupling is secured from above by the support piece.

13. A device for harvesting artemia cysts comprising:
a) a front support frame;
b) a first angled arm and a second angled arm coupled to the front support frame;
c) a rear support frame having one or more cross members and a support piece;
d) a net having a first open end secured to the front support frame, wherein the first open end of the net conforms to the front support frame, and a second open end;
e) a coupling secured to the rear support frame, having a first coupling end and a second coupling end, wherein the first coupling end is in communication with the second open end of the net;
f) a conduit having a first conduit end attached to the second coupling end and a second conduit end in communication with a dewatering system;
g) one or more straps securing the second open end of the net to the coupling, whereby the net remains substantially taut and wherein the net has an aspect ratio of at least approximately 4:1;
h) a sledding frame coupled to the first and second angled arms and the rear support frame;
i) one or more skids coupled to the sledding frame;
j) a first inflation device coupled at a first end thereof to the first angled arm and at a second end thereof to the rear support frame;
k) a second inflation device coupled at a third end thereof to the second angled arm and at a fourth end thereof to the rear support frame; and
l) an air pressure line in communication with the first inflation device and the second inflation device.

14. The device of claim 13, wherein the first and second inflation devices are substantially cylindrical inflatable bladders.

15. The device of claim 13, wherein the first and second inflation devices are respectively secured to the first and second angled arms and the rear support with other straps.

16. The device of claim 13, wherein the air pressure line is in communication with a compressor.

17. The device of claim 13, wherein the one or more straps are ratcheting straps.

18. The device of claim 13, wherein the coupling is supported from beneath by the one or more cross members of the rear support frame and wherein the coupling is secured from above by the support piece.

* * * * *